(12) United States Patent
Seetharaman et al.

(10) Patent No.: US 11,966,384 B2
(45) Date of Patent: Apr. 23, 2024

(54) GENERATING EXTERNAL IDENTIFIERS FOR DATA ENTITIES USING A DATA CATALOG SYSTEM

(71) Applicant: Oracle International Corporation, Redwood Shores, CA (US)

(72) Inventors: Ganesh Seetharaman, Redwood Shores, CA (US); Robert Costin Velisar, Belmont, CA (US); Yuda Dai, Mountain View, CA (US); Yuen Sheung Chan, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 123 days.

(21) Appl. No.: 17/069,778

(22) Filed: Oct. 13, 2020

(65) Prior Publication Data

US 2022/0114163 A1    Apr. 14, 2022

(51) Int. Cl.
*G06F 16/22* (2019.01)
*G06F 16/23* (2019.01)
*G06F 16/958* (2019.01)

(52) U.S. Cl.
CPC ...... *G06F 16/2379* (2019.01); *G06F 16/2228* (2019.01); *G06F 16/2365* (2019.01); *G06F 16/972* (2019.01)

(58) Field of Classification Search
CPC .... G06F 16/2379; G06F 16/972; G06F 16/10; G06F 16/289; G06F 11/0709; G06F 16/2228; G06F 16/2365
See application file for complete search history.

(56) References Cited

U.S. PATENT DOCUMENTS

| 10,027,766 | B2 * | 7/2018 | Greenan | H04L 67/1097 |
| 2021/0119970 | A1 * | 4/2021 | Raphael | H04L 63/0263 |
| 2021/0297451 | A1 * | 9/2021 | Raphael | H04L 41/0873 |

* cited by examiner

*Primary Examiner* — Marcin R Filipczyk
(74) *Attorney, Agent, or Firm* — Kilpatrick Townsend & Stockton LLP

(57) ABSTRACT

A data catalog system is disclosed that provides capabilities for uniquely identifying and retrieving data entities stored in diverse data sources managed by an organization. The data catalog system includes capabilities for generating a unique external identifier for a data entity (e.g., a data asset or a data object) by identifying a set of immutable configuration parameters associated with the data asset and identifying a set of data object attributes that uniquely identify data objects within the data asset. The generated unique external identifiers are stored as part of the metadata harvested by the data catalog system. The external identifiers are used to enforce a single representation of the data assets and the data objects in the data catalog system. The external object identifiers are used to perform data lookups and reconcile states of data entities during the metadata harvesting process.

14 Claims, 9 Drawing Sheets

| Data Asset Type | Folder Type | Set of configuration parameters associated with Data Asset Type | Data Asset External Identifier | Data Objects | Data Object External ID |
|---|---|---|---|---|---|
| Database | Schema | Hostname, domain name, database name | mysql.mycompany.com | Table T1 | mysql.mycompany.com/Schema1/T1 |
| | | | | Table T2 | mysql.mycompany.com/Schema1/T2 |
| | | | | Table T3 | mysql.mycompany.com/Schema1/T3 |
| | | | | Function Foo | mysql.mycompany.com/Schema/Foo |
| | | | | Stored Procedure Proc | mysql.mycompany.com/Schema/proc_id |
| Object Storage System | Containers/ buckets | Connection end point, namespace, compartment | https://swiftobjectstorage.us-phoenix-1.mycompany.com | Json Object | https://swiftobjectstorage.us-phoenix-1.mycompany.com/v1/paasdevdcatinfra/bucket1/zrh_hourly_region_res/bling_metering/1988101605_hyd_hourly_region_res_delayed.json/Account.Type.Code |

FIG. 3

GENERATING EXTERNAL IDENTIFIERS FOR DATA ENTITIES USING A DATA CATALOG SYSTEM

BACKGROUND

In today's information world, the ability to quickly discover, ingest, and manage large amounts of data is essential for the success of the organization and to its users. In order to manage the rapid growth of data, a number of organizations are using data catalogs as their primary tool for efficiently identifying, searching and retrieving information. A data catalog provides users with a centralized location for searching for data entities (e.g., data assets and data objects) stored in multiple and diverse data sources comprised in an organization so that users do not have to manually search for the data stored in the individual data sources. In order to ingest the data from such diverse and heterogeneous data sources, a data catalog system must include capabilities for quickly and efficiently identifying and processing the data from the data sources. In an environment where the data ingested by the data sources is rapidly growing and changing, existing techniques provided by data catalog systems for efficiently discovering and retrieving data are often times inadequate.

SUMMARY

This disclosure relates generally to data catalog systems. More specifically, but not by way of limitation, this disclosure describes a data catalog system that includes improved capabilities for uniquely identifying and retrieving data entities stored in diverse data sources managed by an organization.

In certain embodiments, the data catalog system performs processing to access a data catalog metadata repository comprising metadata associated with a data asset and metadata associated with a set of data objects associated with the data asset. The processing then comprises identifying, based at least in part on the metadata, one or more configuration parameters associated with the data asset that uniquely identify the data asset. The configuration parameters associated with a data asset (e.g., a database, an object storage, a file system and the like) may include, but are not limited to, a hostname, a port identifier, an Internet Protocol (IP) address, a service name, a Universal Resource Locator (URL), a resource identifier, a protocol type (HTTP, Thrift, SCAN, Binary, Swift) associated with the data asset. The processing includes generating a unique external identifier for the data asset based at least in part on the set of one or more configuration parameters.

In certain examples, the processing further includes identifying, based at least in part on the accessed metadata, a set of one or more attributes that uniquely identify a data object associated with the data asset. The set of attributes may include, but are not limited to, object types (delimiter separated files, tables, views, constraints), object subtypes, folder types (that identify a type of internal data structure that maps or identifies a relationship between a data asset to its data objects) namespaces, paths, or internal identifiers associated with the data objects. The processing includes generating a unique external identifier for the data object based at least in part on the set of one or more attributes that uniquely identify the data object and the set of one or more configuration parameters that uniquely identify the data asset associated with the data object. In some examples, the processing includes storing the unique external identifier of the data asset and the data object associated with the data asset in the metadata repository.

In certain examples, the data catalog system performs processing to utilize the external object identifiers to lookup a data asset and/or data objects and to reconcile a state (e.g., that occurs as a result of create, read, update, delete (CRUD) operations) of the data asset and the data objects during a metadata harvesting process.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 is an exemplary illustration of harvested metadata stored for a data asset and a set of data objects associated with the data asset, according to certain embodiments.

DETAILED DESCRIPTION

Figure 1:
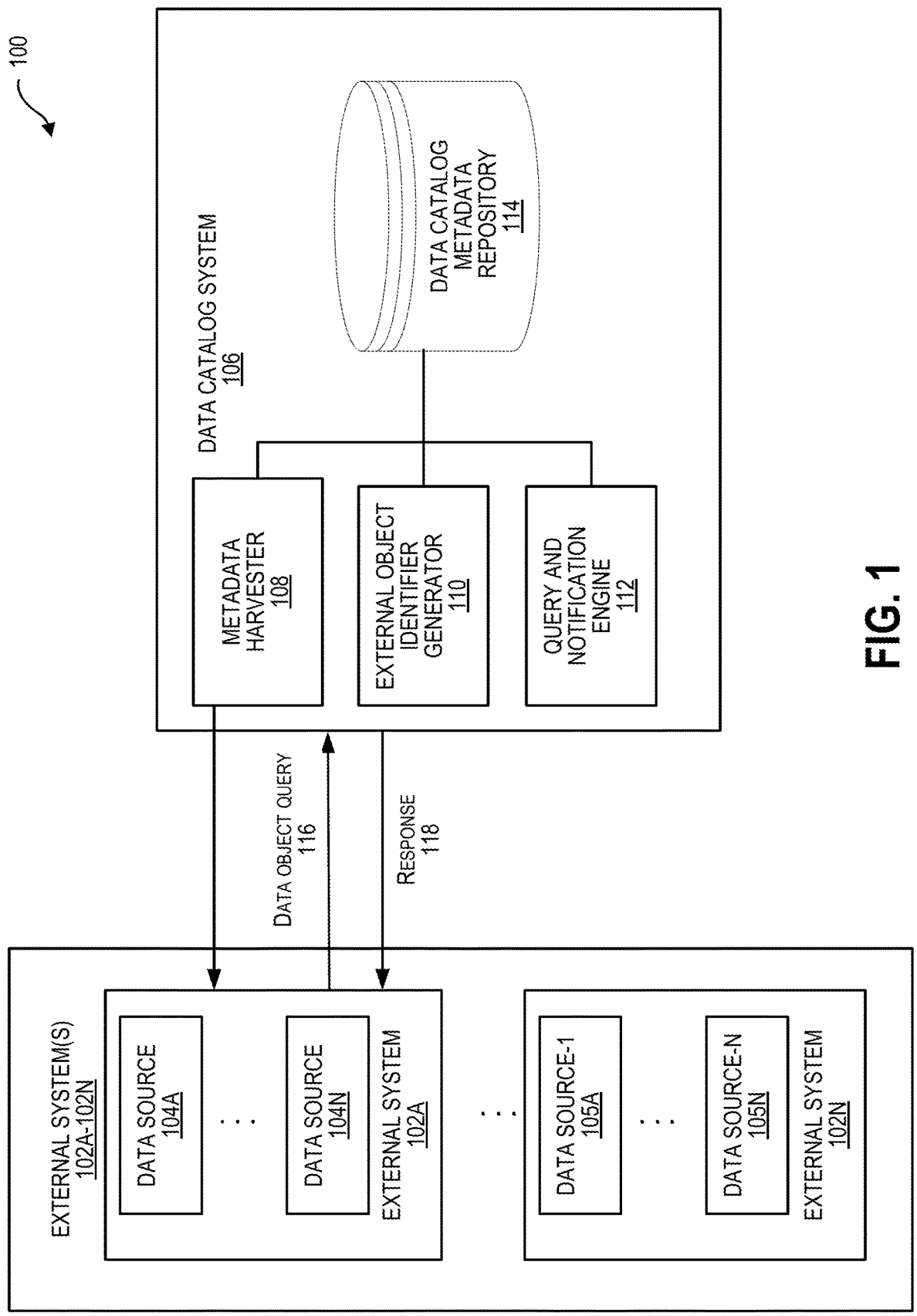
FIG. 1 depicts an example computing environment including a data catalog system that includes capabilities for uniquely identifying and retrieving data entities associated with a diverse set of data sources managed by an organization.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A data catalog system provides users with a centralized location (a single view) of data entities (e.g., data assets and data objects) stored in multiple and diverse data sources within an organization. A data catalog system collects and harvests metadata (i.e., data that describes the data generated by the data sources) to create an informative and searchable inventory of all the data entities within the organization. Data entities may represent any physical data source (e.g., a database, object stores, file systems, documents, data streams, applications), or data objects within a physical data source (e.g., database tables, views, XML files, events and so on).

Metadata harvesting typically involves the collection of metadata about data stored in multiple data sources and the storage of the collected metadata (along with the data) as data objects in a data catalog repository. For example, as part of the harvesting process, a data catalog system identifies the data format, structure, or schema of a data source (e.g., file system) to create a structured version of a data asset (that describes the data source) in a data catalog repository. Harvesting techniques used by data catalog systems typically involve the use of internal identifiers such as object identifiers, file names, Uniform Resource Locators (URLs), resource paths, directories or files generated by a data source of an external system (e.g., an organization) to identify and retrieve information about data entities (e.g., data assets and data objects) stored in the data source. However, when data is ingested from multiple and diverse data sources, the use of internal identifiers may not always result in the accurate identification and retrieval of desired data entities stored in a data source. This is because multiple registrations of a data asset by different data sources (systems) may result in duplication of a resource in the data catalog system with no viable method for metadata stitching or resolving the duplicate identifiers. For instance, an internal file identifier (e.g., which could be a system generated sequence of numbers) used by a first file system (i.e., a data source) for identifying and referencing a file can be reused by a second file system managed by the same or different external entity for identifying a different file stored in the second file system.

The various embodiments described in the present disclosure disclose a data catalog system that includes improved capabilities for uniquely identifying and retrieving data entities stored in diverse data sources managed by an organization. The disclosed data catalog system includes capabilities for generating a unique external identifier for a data entity (e.g., a data asset or a data object) without relying on internal identifiers generated by the data sources for identifying the data entity. In certain embodiments, the data catalog system generates a unique external identifier for a data asset by identifying a set of immutable configuration parameters associated with the data asset. An immutable configuration parameter as described herein is a configuration parameter whose value cannot change over the lifetime of the data asset. The immutable configuration parameters identified for a data asset may depend on several factors including the immutable property of a configuration parameter associated with the data asset and the type of the data asset. Configuration parameters associated with a data asset (e.g., a database, an object storage, a file system and the like) may include, but are not limited to, a hostname, a port identifier, an Internet Protocol (IP) address, a service name, a Universal Resource Locator (URL), a resource identifier, a protocol type (Hyper Text Transfer Protocol (HTTP), Thrift, Binary, Swift etc.) associated with the data asset.

In certain embodiments, the data catalog system generates a unique identifier for a data object associated with the data asset based at least in part on the immutable configuration parameters identified for the data asset and a set of data object attributes that uniquely identify the data object. The set of data object attributes may include, but are not limited to, object types (delimiter separated files, tables, views, constraints), object subtypes, relationships (folder—files, schema, tables, bucket, objects), namespaces, paths, internal identifiers used by the external system and the like. The generated external identifier for the data object is used to enforce a single representation of the data object in the data catalog system.

In certain examples, the data catalog system includes capabilities for storing the generated external object identifiers as part of the harvested metadata for a data asset and/or data object. The data catalog system uses the generated external object identifiers to lookup a data asset and/or data objects and to reconcile the state (e.g., that occurs as a result of create, read, update, delete (CRUD) operations) of the data asset and the data objects during the metadata harvesting process.

In certain examples, the data catalog system receives queries from a user of an external system (e.g., an organization) regarding a data asset or a data object, performs a lookup of the data asset or data object using its unique external object identifier (which is stored as part of the harvested metadata for the data object), retrieves metadata associated with the data asset or data object and communicates results back to the user. In certain examples, the data catalog system also includes capabilities for tracking changes to a data asset or data objects using their unique external identifiers and transmitting notifications to the users of an external system about the updated data asset or updated data objects.

Referring now to the drawings, FIG. 1 depicts an example computing environment 100 including a data catalog system 106 that includes capabilities for uniquely identifying and retrieving data entities associated with a diverse set of data sources managed by an organization. In the embodiment depicted in FIG. 1, the data catalog system 106 includes several systems and subsystems or engines including a metadata harvester 108, an external object identifier generator 110 and a query and notification engine 112. The systems and subsystems depicted in FIG. 1 may be implemented using software (e.g., code, instructions, program) executed by one or more processing units (e.g., processors, cores), hardware, or combinations thereof. The software may be stored on a non-transitory storage medium (e.g., on a memory device). Portions of data or information used by or generated by the data catalog system 106 as part of its processing may be stored in a persistent memory store such as a data catalog metadata repository 114. The computing environment 100 depicted in FIG. 1 is merely an example and is not intended to unduly limit the scope of claimed embodiments. One of ordinary skill in the art would recognize many possible variations, alternatives, and modifications. For example, in some implementations, the data catalog system 106 can be implemented using more or fewer subsystems than those shown in FIG. 1, may combine two or more subsystems, or may have a different configuration or arrangement of subsystems.

The data catalog system 106 may be implemented in various different configurations. In certain embodiments, the data catalog system 106 may be provided as a subsystem in an external system (e.g., enterprise or an organization) servicing users of the external system. In some other embodiments, the data catalog system 106 may be implemented on one or more servers of a cloud provider and its functionality may be provided to subscribers of cloud services on a subscription basis.

The data catalog system 106 may be communicatively coupled to one or more external systems 102A-102N, possibly via one or more communication networks. The external systems may represent enterprises, organizations or business entities that wish to utilize the services provided by the data catalog system 106. Each external system may comprise a set of one or more data sources. For instance, in the embodiment shown in FIG. 1, the external system 102A comprises a set of one or more data sources 104A-104N. Similarly, the external system 102N comprises a different set of data sources 105A-105N. Examples of data sources include, but are not limited to, databases, object stores, files, documents, message streams, or applications managed by the external system.

In certain embodiments, a user of an external system (e.g., 102A) may interact with the data catalog system 106 using a user device that is communicatively coupled to the data catalog system 106, possibly via one or more communication networks. The user device may be of various types, including but not limited to, a mobile phone, a tablet, a desktop computer, and the like. A user may interact with the data catalog system 106 using an application (e.g., a browser) executed by the user device. For example, the user may use a user interface (UI) (which may be a graphical user interface (GUI)) of an application executed by the user device to interact with the data catalog system 106. For instance, the user may, via the UI, identify connectivity details to connect to a data source, register the data source as a data asset in the data catalog system 106 and add a connection to the data asset. Registering a data source as a data asset may involve, gathering, by the data catalog system 106, a set of configuration parameters associated with the data asset to connect to the data asset and validating the configuration parameters associated with the data asset. The set of configuration parameters associated with a data asset may be specific to a type of data asset (e.g., a database, an object storage, a file system) and may include, but is not limited to, a hostname, a port identifier, an Internet Protocol (IP) address, a service name, a Universal Resource Locator (URL), a resource identifier, or a protocol type (HTTP, Thrift, Binary, Swift) associated with the data asset.

Upon successfully registering the data source as a data asset, the user may, via the user device, send a request to the data catalog system 106 to harvest metadata associated with the data asset. In certain embodiments, a metadata harvester 108 in the data catalog system 106 is configured to harvest metadata associated with the data asset and store the harvested metadata in the data catalog metadata repository 114. The harvested metadata may include, for instance, information that describes the structure of the data asset, configuration parameters associated with the data asset and information that describes the structure of data objects associated within the data asset. For instance, information describing the structure of data objects may include data types, column types, names, delimiters of fields, and/or any other information associated with the data objects. Examples of harvested metadata associated with data assets and data objects stored in the data catalog metadata repository 114 is described in FIG. 3.

In certain examples, the data catalog system 106 comprises an external object identifier generator 110. The external object identifier generator 110 is configured to generate unique external identifiers for data assets and data objects associated with the data assets based at least in part on the metadata harvested by the metadata harvesting engine 108. In certain examples, the unique external identifiers may be stored as part of the harvested metadata for the data assets and the data objects. In a certain implementation, the unique external identifiers for the data assets and the data objects are generated in cache memory by the external object identifier generator 110. The state of the data assets and data objects are then updated to include the unique external identifiers and stored as part of the harvested metadata for the data object in the metadata repository 114. Details related to the processing performed by the external object identifier generator 110 for generating unique external object identifiers for data assets and data objects is described below with respect to the flowchart depicted in FIG. 2 and the accompanying description.

In certain embodiments, the data catalog system 106 may be configured to provide users with a unified and centralized view of the data assets and the data objects associated with the data assets. For instance, a user may via, the UI, view a set of data assets and data objects associated with an external system, select a particular data object and send a request (e.g., a data object query 116) to the data catalog system 106 to retrieve metadata associated with the data object. In response to the user request, a query and notification engine 112 in the data catalog system 106 may be configured to search for and identify the data object using its unique external object identifier (stored as part of the harvested metadata for the data object), retrieve the data object and communicate a response 118 back to the user. The response 118 may be output to the user via the UI and may include metadata about the data object, and possibly other information about the data object such as the data asset type of the data object, the attributes and attribute values associated with the data object and so on. By way of example, if the data object queried by the user is a database table, the response 118 transmitted to the user may include information about the attributes (one or more columns) of the table.

In certain embodiments, the data query and notification engine 112 may be configured to track changes made to the data assets and data objects in an external system by identifying the data asset and/or data object using their generated external object identifiers and transmitting a notification to a user of an external system (e.g., an organization) when changes to the data asset or data object occur. Details related to the processing performed by the query and notification engine 112 is described below with respect to the flowchart depicted in FIG. 4 and its accompanying description.

Figure 2:
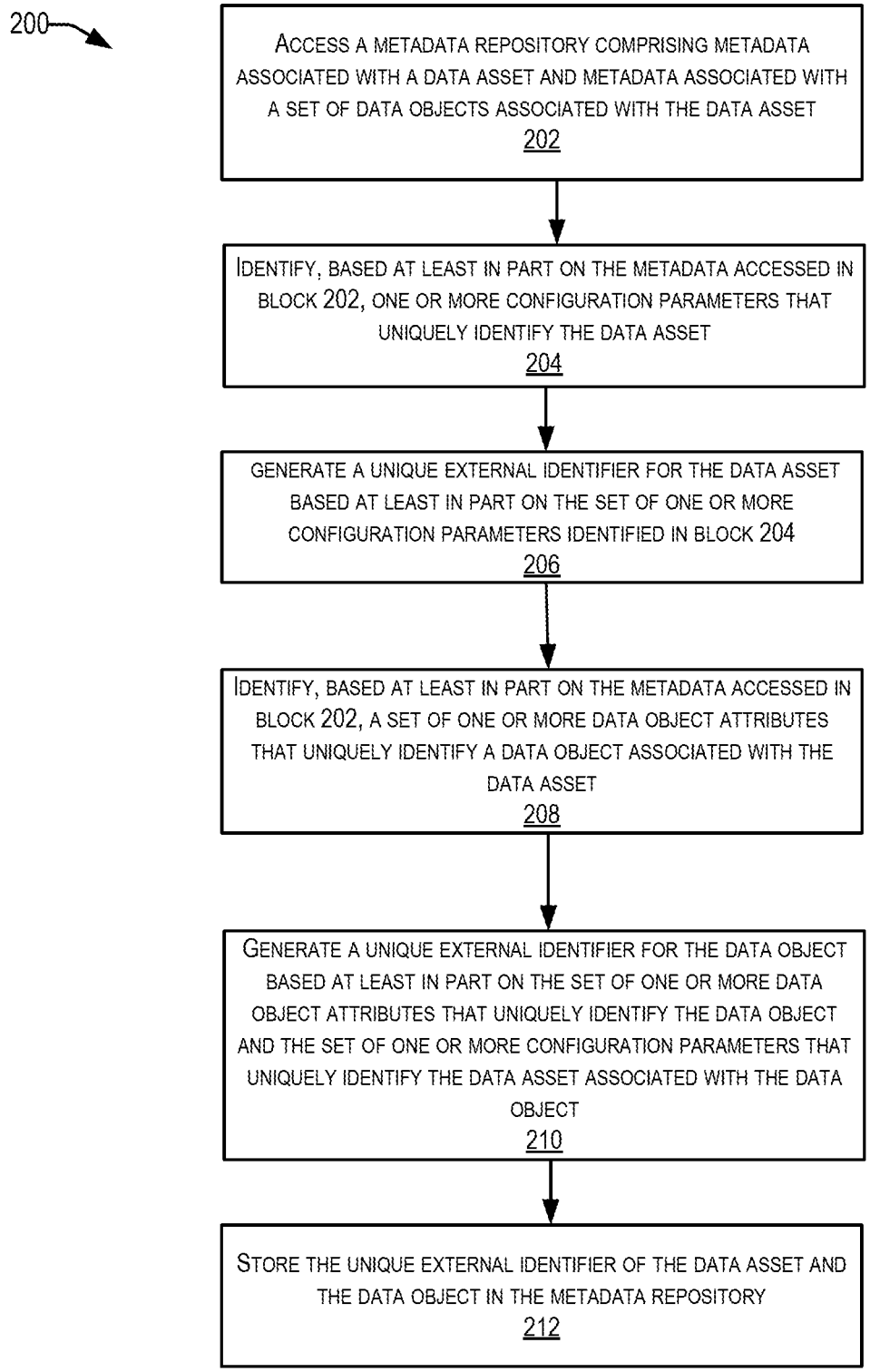
FIG. 2 depicts an example of a process performed by the data catalog system shown in FIG. 1 for generating a unique external identifier for a data object associated with a data asset, according to certain embodiments.

FIG. 2 depicts an example of a process 200 performed by the data catalog system for generating a unique external identifier for a data object associated with a data asset, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the external object identifier generator 110 in the data catalog system 106.

At block 202, processing is initiated when the external object identifier generator 110 accesses the data catalog metadata repository 114 comprising metadata associated with a data asset and metadata associated with a set of data objects associated with the data asset. As previously described, the metadata associated with a data asset may comprise information describing the structure of the data asset and configuration parameters associated with the data asset. Metadata associated with data objects of a data asset may comprise information describing the structure of the data objects which may include data types, column types, names, delimiters of fields, and/or any other information associated with the data objects.

At block 204, the external object identifier generator 110 identifies, based at least in part on the metadata accessed in block 202, one or more configuration parameters associated with the data asset that uniquely identify the data asset. In certain embodiments, the identified configuration parameters comprise one or more immutable configuration parameters associated with the data asset. As previously described, configuration parameters associated with a data asset (e.g., a database, an object storage, a file system and the like) may include, but are not limited to, a hostname, a port identifier, an Internet Protocol (IP) address, a service name, a Universal Resource Locator (URL), a resource identifier, a protocol type (HTTP, Thrift, SCAN, Binary, Swift) associated with the data asset. The immutable configuration parameters identified for a data asset in block 204 may depend on several factors including the immutable property of a configuration parameter and the particular type of data asset. For instance, a "database name" may be identified as an immutable configuration parameter that is used to uniquely identify a "service name" of a "database" data asset whereas a "port number" may be identified as a mutable configuration parameter because there may be multiple ports (listeners) that can be used to connect to the data asset (i.e., the end point). Other examples of immutable configuration parameters for a database may include, but are not limited to, region and availability domain information embedded in the endpoint Universal Resource Locator (URL), the namespace, the compartment identifier, the service/resource identifier, Domain Name Service (DNS) or the Fully Qualified Domain Name (FQDN) used to resolve the data asset through a DNS proxy.

At block 206, the external object identifier generator 110 generates a unique external identifier for the data asset based at least in part on the set of one or more configuration parameters identified in block 204. By way of example, a unique external identifier for an SQL "database" data asset may be represented as "mysql.mycompany.com/db1." The unique external identifier in this example is generated based on identifying a set of one or more immutable configuration parameters associated with the data asset such as its hostname (which may be a combination of the machine on which the database resides and its domain name) and the database name. Additional examples of unique external identifiers generated by the data catalog system for different types of data assets are described in FIG. 3. The unique external identifier for the data asset and the data objects are stored as part of the harvested metadata for the data asset.

At block 208, the external object identifier generator 110, identifies, based at least in part on the metadata accessed in block 202, a set of one or more attributes that uniquely identify a data object associated with the data asset. The set of attributes may include, but are not limited to, object types (delimiter separated files, tables, views, constraints), object subtypes, folder types (that identify a type of internal data structure that maps or identifies a relationship between a data asset to its data objects) namespaces, paths, internal identifiers used by the external system and the like. By way of example, for a "database" data asset, a "schema" folder type may be used to map the database to data objects (e.g., tables, views, external tables, functions, stored procedures) within the database whereas for an "object storage" data asset, the folder type may represent a "bucket." Similarly, for a message stream, the folder type may represent a Kafka topic. A "namespace" attribute may be used to identify and refer to data objects of various kinds to avoid name collisions between multiple data objects that share the same name. For instance, a directory can be a separate namespace in a file system, and two different directories may both contain a file having the same file name. A "path" attribute is used to describe the general form of a name of a file or directory and specifies a unique location in a data asset such as a file system.

At block 210, the external object identifier generator 110 generates a unique external identifier for the data object based at least in part on the set of one or more data object attributes that uniquely identify the data object (identified in block 208) and the set of one or more configuration parameters that uniquely identify the data asset associated with the data object (identified in block 204). By way of example, a data object associated with a "database" data asset may be a database table, T1. A unique external identifier for the database table T1 may be represented as follows:
"https://adb.us-phoenix1.mycompany.com/ ocid1.tenancy.oc1.aaaaaaaahk25msb4b/schema1/T1".

In the above example, the unique external identifier for the "database" data asset is generated based on identifying a set of one or more immutable configuration parameters associated with the data asset such as its hostname, "adb.us-phoenix1.mycompany.com" and its tenancy, "ocid1.tenancy.oc1.aaaaaaaahk25msb4b," and a data object attribute (i.e., schema) that uniquely identifies the data object (i.e., table T1) in the database.

At block 312, the external object identifier generator 110 stores the unique external identifier of the data asset and the data object associated with the data asset in the metadata repository 114.

FIG. 3 is an exemplary illustration of harvested metadata stored for a data asset and a set of data objects associated with the data asset, according to certain embodiments. As depicted in FIG. 3, in one implementation, the harvested metadata for a data asset and data objects associated with the data asset may be stored in a table 300 in a database within the data catalog metadata repository 114. In the depicted example, the table 300 stores harvested metadata describing a data asset (e.g., a database and an object storage system) and a set of data objects associated with the data asset. Additionally, the harvested metadata comprises a set of configuration parameters associated with the data asset, a data asset external identifier and data object external identifiers associated with the set of data objects. As shown in FIG. 3, the harvested metadata stored in table 300 is organized into one or more columns including a data asset type column identifying a type of data asset, a folder type column identifying a type of internal data structure that maps the data asset to data objects associated with the data asset, a data asset configuration parameters column identifying a set of configuration parameters associated with the data asset, a data objects column identifying a set of data objects associated with the data asset, a data asset external identifier column identifying a unique identifier generated for the data asset and a data object external identifier column identifying the unique external identifier generated for the data object associated with the data asset.

In the depicted example, the unique external identifier for an SQL "database" data asset is generated based on identifying a set of one or more immutable configuration parameters associated with the data asset such as its hostname (which may be a combination of the machine on which the database resides and its domain name) and the database name as follows: "mysql.mycompany.com/db1." As further depicted in the example shown in table 300, a set of data objects associated with the database asset comprise a set of one or more tables, T1, T2 and T3, a function Foo and a stored procedure Proc. The unique external identifier for table T1 (e.g., mysql.mycompany.com/Schema/T1) is generated based at least in part on the set of immutable configuration parameters identified for the database (i.e., mysql.mycompany.com) and a set of properties like parent schema and object type, if the namespace parent allows shared names across data types (e.g., the table name, T1 and the unique schema name Schema1 that uniquely identifies the table T1). In a similar manner as shown in the table 300, unique external identifiers may be generated for database tables T2 and T3. Additionally, the table 300 depicts examples of external object identifiers generated for the function "Foo" and the stored procedure "Proc."

Table 300 additionally depicts a unique external identifier that is generated by the data catalog system 106 for an object storage data asset. As an example, the unique external identifier of a physical artifact, for e.g., a JSON (JavaScript Object Notation) object in an object storage system can be represented as shown below:
https://swiftobjectstorage.us-phoenix-1.mycompany.com/v1/paasdevdcatinfra/bucket1/zrh_hourly_region_res/bling_metering/1988101 605_hyd_hourly_region_res_delayed.json/Account.Type.Code.

In this example, the unique external identifier for the JSON (JavaScript Object Notation) in an object storage system is generated based on identifying one or more immutable configuration parameters that uniquely identify the data asset (i.e., the object storage system) and a set of one or more attributes (Account Type) that uniquely identify the data object (i.e., the JSON object) associated with the data asset. The immutable configuration parameters may include, for instance, the connection endpoint for the object storage system, the namespace, compartment in which it is provisioned, the bucket under the namespace, the region, the folder prefix, the file type and even nested type definitions in the case of data artifacts that support complex types.

The illustrated database table 300 is merely an example and not intended to unduly limit the scope of claimed embodiments. One of ordinary skill in the art would recognize many possible variations, alternatives, and modifications. For example, in some implementations, the database table 300 can be implemented using more or fewer columns than those shown in FIG. 3, may combine two or more columns of information, or may have different columns than shown in the illustration. Additionally, while the implementation shown in table 300 depicts the metadata harvested for a specific type of data asset (e.g., a database and an object storage system), it is to be appreciated that in alternate embodiments, the metadata repository 114 may be configured to store harvested metadata for other types of data assets managed by an external system. These data asset types may include, but are not limited to, file systems, message streams and so on.

In certain embodiments, the data catalog metadata repository 114 may store additional types of metadata for data assets and data objects managed by an external system. The metadata may be harvested by the metadata harvester 108 as part of the harvesting process. The additional metadata may include, operational metadata that describes when a data asset or a data object managed by the data asset was created and when it was accessed, used, or changed. For instance, operational metadata may include information about when a database table was refreshed, the number of times the table was accessed and so on. In certain examples, the metadata associated with a data asset may also include business metadata that describes the business knowledge that users have about a data asset in the external system. Business metadata may include, for instance, business descriptions, comments, annotations, classifications, and the like for data assets in the external system.

The operations performed by the data catalog system 106 to identify, retrieve and track changes to data assets and data objects associated with the data assets using their unique external identifiers are now described with reference to FIG. 4. One or more computing devices (e.g., the external object identifier generator 110 and the query and notification engine 112 in the data catalog system 106) implement operations depicted in FIG. 4 by executing suitable program code. For illustrative purposes, the process 400 is described with reference to certain examples depicted in the figures. Other implementations, however, are possible.

Figure 4:
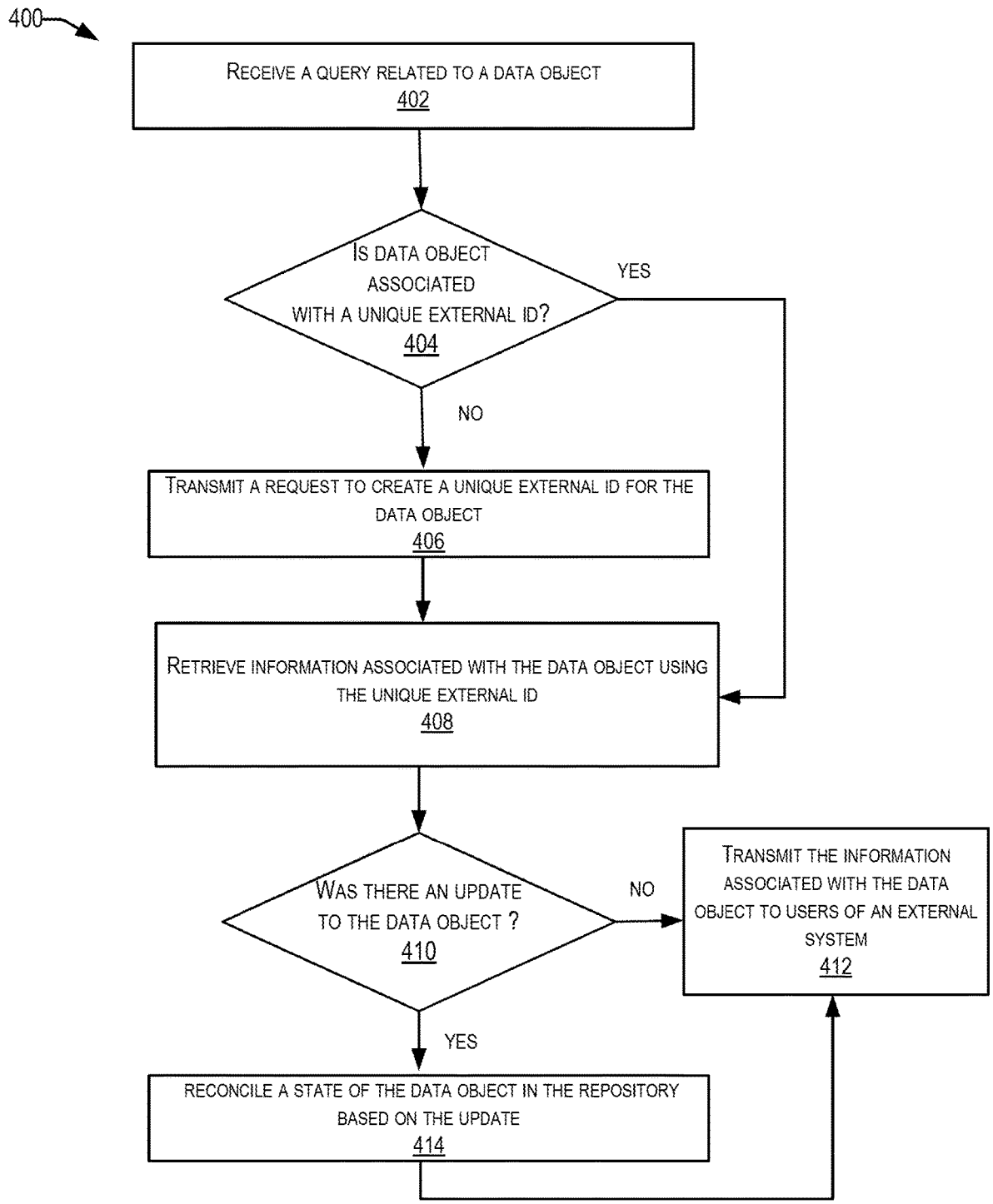
FIG. 4 depicts an example of a process for identifying and tracking changes to a data object using its unique external identifier, according to certain embodiments

FIG. 4 depicts an example of a process 400 for identifying and tracking changes to a data object using its unique external identifier, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the external object identifier generator 110 and the query and notification engine 112 in the data catalog system 106.

At block 402, the process 400 involves receiving, by the query and notification engine 112, a query related to a data object. For example, the query may relate to obtaining information (e.g., metadata stored in one or more columns of a table) in a "database" data asset stored in the data catalog metadata repository 114.

In response to receiving the query, at block 404, the process 400 may involve, determining, by the query and notification engine 112, if the data object is associated with a unique external identifier. For instance, the process at block 404 may involve, accessing, by the query and notification engine 112, metadata associated with the data object stored in the repository 114 to determine if the data object is associated with a unique external identifier. If the data object is associated with a unique external identifier, the processing proceeds to block 408 to retrieve information associated with the data object using its unique external identifier. For instance, the information may include data values associated with the data object, a description of the data object, a classification of the data object within the data asset and so on.

If the data object is not associated with a unique external identifier, the process 400 involves, transmitting by the query and notification engine 112, a request to the external object identifier generator 110, to create/generate a unique external identifier for the data object at block 406 and retrieving information associated with the data object using its unique external identifier at block 408.

In certain embodiments, at block 410, the process may involve, determining, by the query and notification engine 112, based at least in part on the metadata retrieved for the data object (at block 408) if there was an update made to the data object. For instance, an update may include information related to a change in the name of the data object (e.g., a database table), information related to a time when the database table was last accessed, modified or refreshed, information related to the number of times the table was accessed and so on.

If there was no update to the data object, at block 412, the query and notification engine 112 transmits the information associated with the data object to one or more users of the external system.

If there was an update made to the data object, at block 414, the query and notification engine 112 reconciles the state of the data object in the metadata repository and performs the processing in block 412 to transmit the information associated with the data object to one or more users of the external system. In certain examples, the information transmitted may also include information related to the update to the data object and may be transmitted as a notification message to the users of the external system.

Example Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
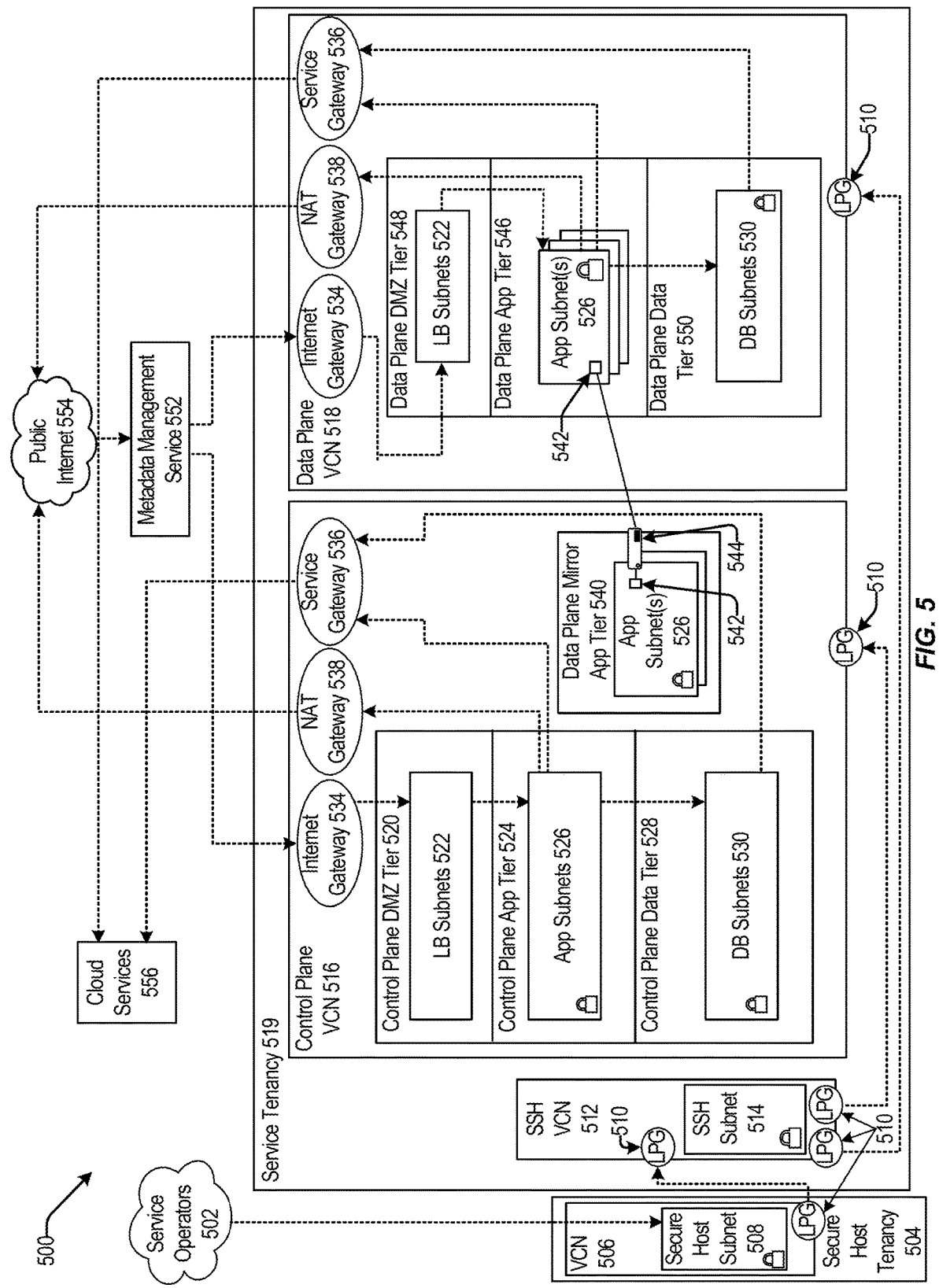
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
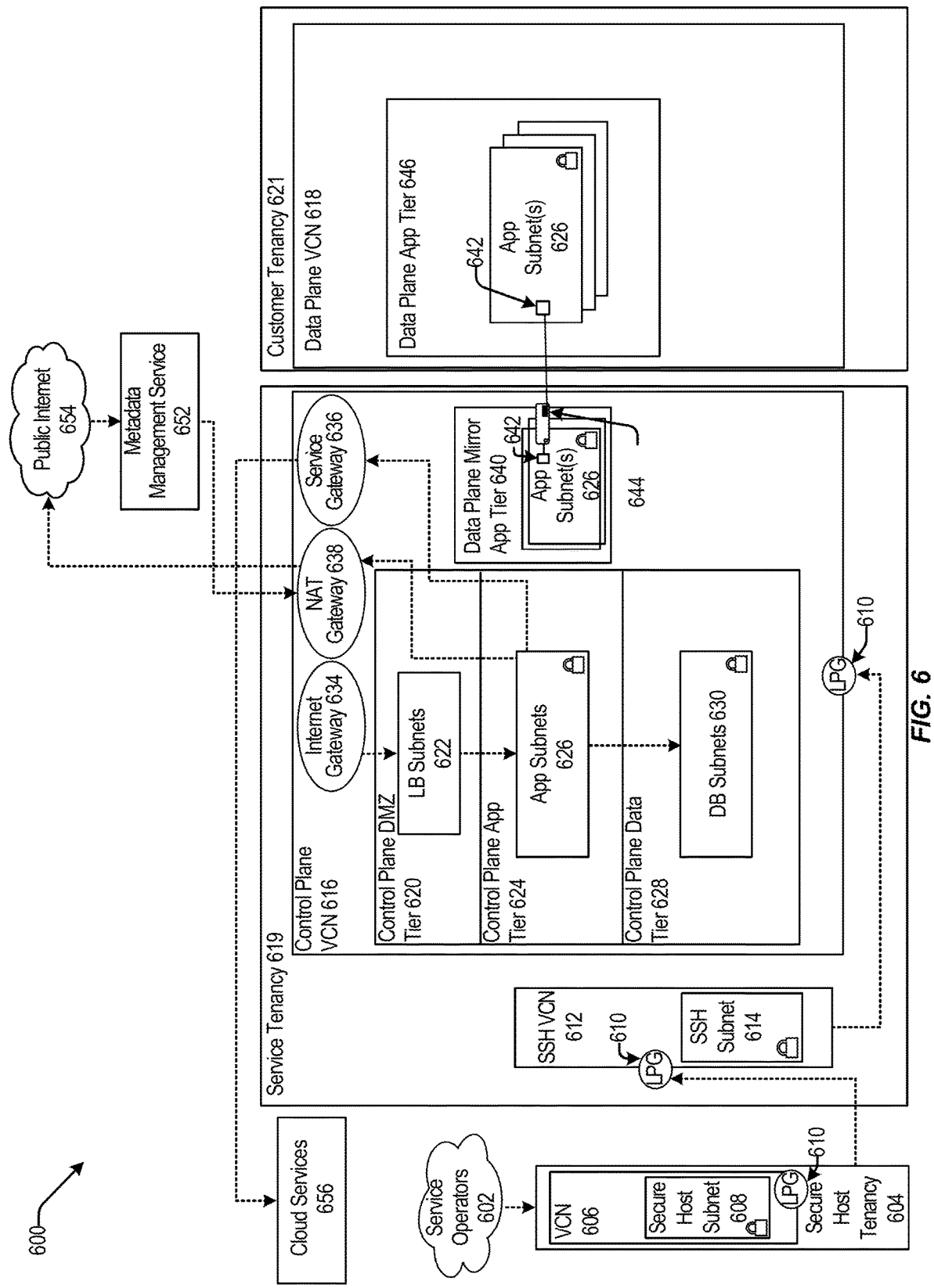
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
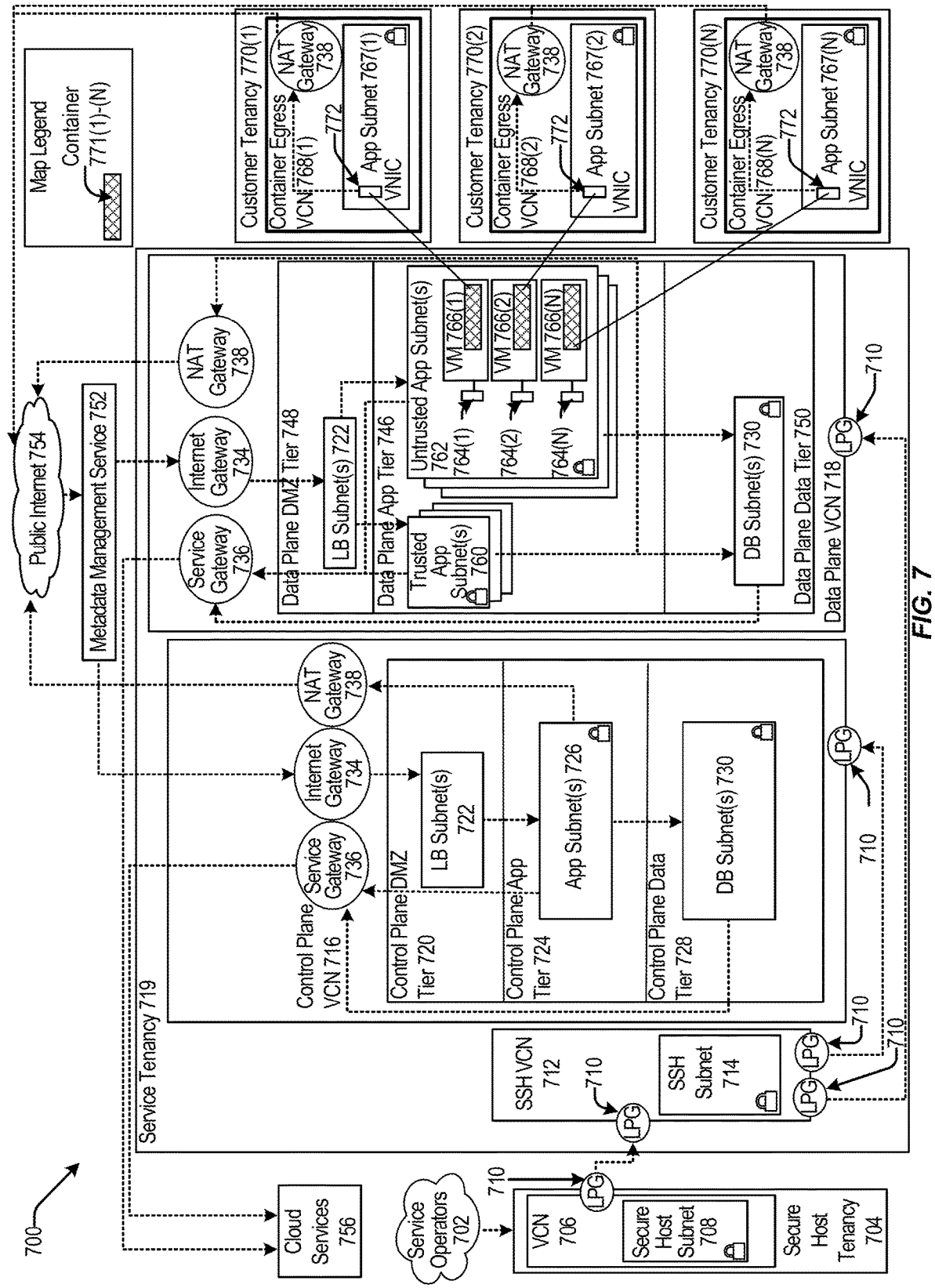
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane VCN 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG. 5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
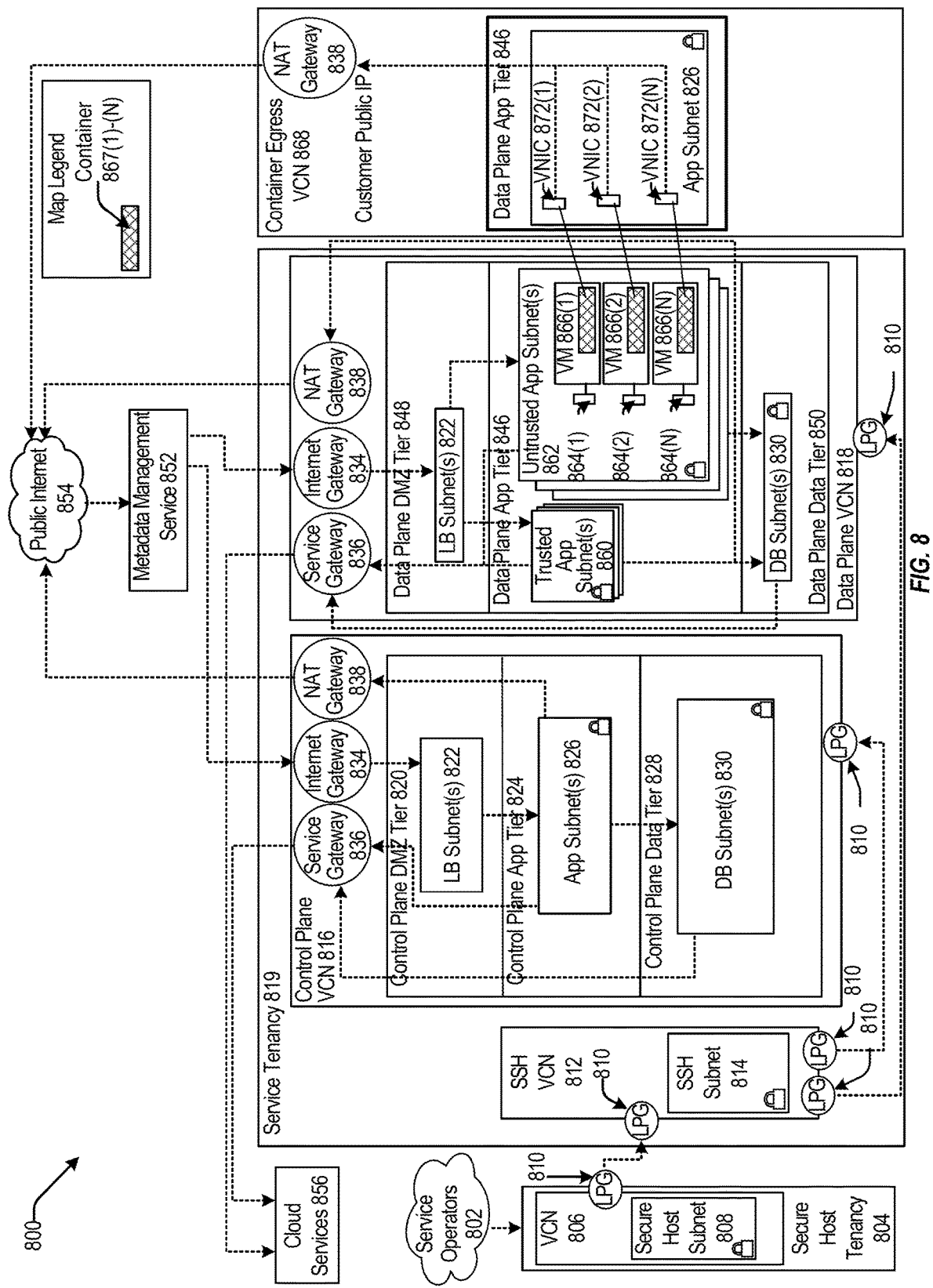
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867 (1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
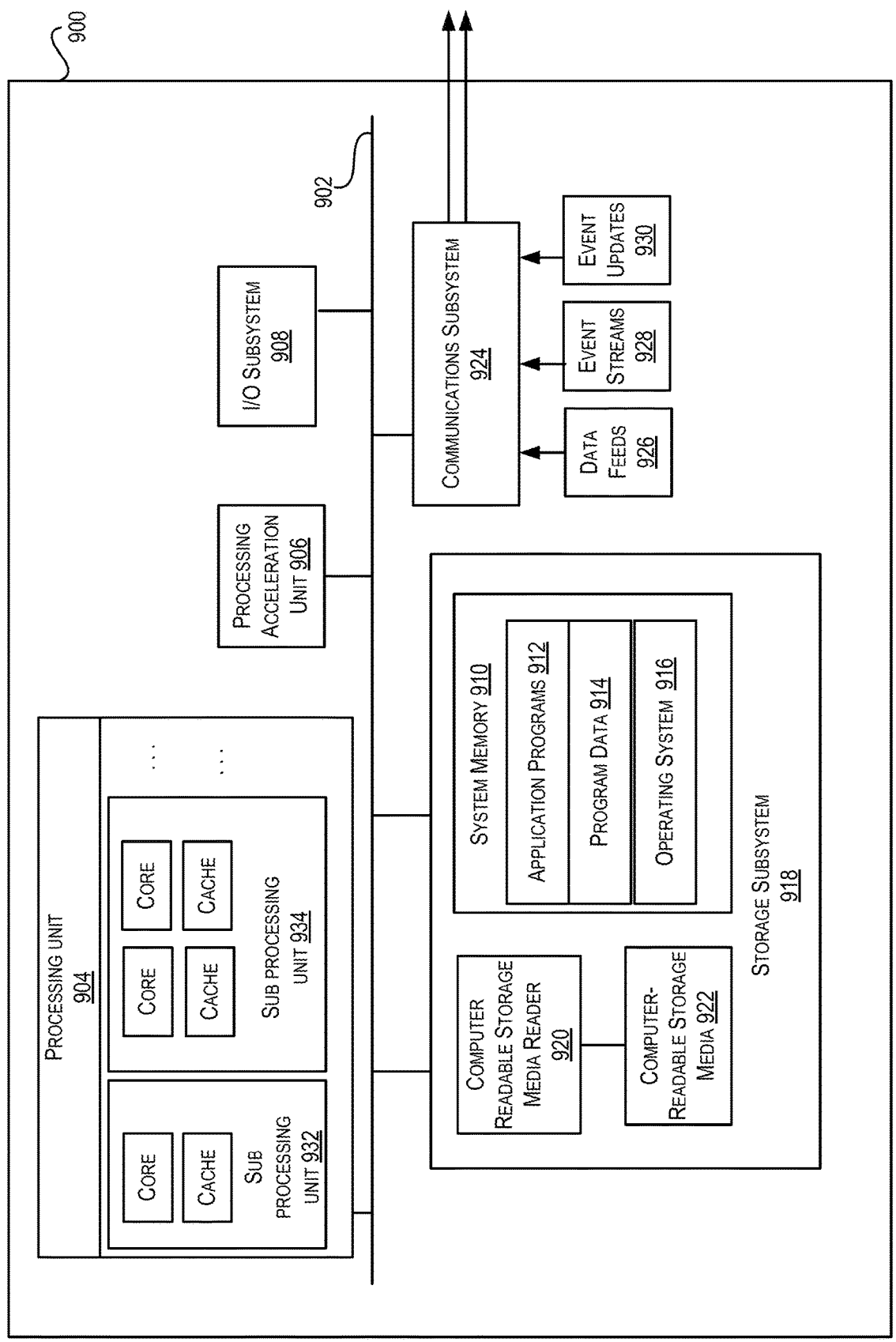
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   accessing, by a computer system, a repository comprising metadata associated with a plurality of data assets, each data asset in the plurality of data assets comprising a plurality of data objects, the plurality of data assets associated with an external system that is communicatively coupled to the computer system;
   for a first data asset in the plurality of data assets, identifying, by the computer system, based at least in part on the metadata, one or more first configuration parameters that uniquely identify the first data asset;
   for a data object associated with the first data asset, identifying, by the computer system, based at least in part on the metadata, one or more first attributes of the data object that uniquely identify the data object, the one or more first attributes of the data object comprising a schema of the data object;
   generating, by the computer system, a first unique external object identifier for the data object, the first unique external object identifier for the data object represented by a string of characters, wherein the string of characters comprise a set of portions, a first portion of the set of portions comprising the one or more first configuration parameters that uniquely identify the first data asset, a second portion of the set of portions comprising the data object associated with the first data asset and a third portion of the set of portions comprising the schema of the data object that uniquely identifies a relationship between the first data asset and the data object associated with the first data asset;
   for a second data asset in the plurality of data assets, identifying, by the computer system, based at least in part on the metadata, one or more second configuration parameters that uniquely identify the second data asset, the second data asset being different from the first data asset;
   for a data object associated with the second data asset, identifying, by the computer system, based at least in part on the metadata, one or more second attributes of the data object that uniquely identify the data object associated with the second data asset, the one or more second attributes of the data object comprising an object type of the data object;
   generating, by the computer system, a second unique external object identifier for the data object, the second unique external object identifier for the data object represented by a string of characters comprising a set of portions, a first portion of the set of portions comprising the one or more second configuration parameters that uniquely identify the second data asset, a second portion of the set of portions comprising the data object associated with the second data asset and a third portion of the set of portions comprising the object type of the data object that uniquely identifies a relationship between the second data asset and the data object associated with the second data asset;
   storing, by the computer system, the first unique external object identifier for the data object associated with the first data asset in the repository;
   storing, by the computer system, the second unique external object identifier for the data object associated with the second data asset in the repository;
   receiving, by the computer system, an update to the data object associated with the first data asset;
   responsive to the update, using, by the computer system, the first external object identifier for the data object for reconciling a state of the data object, reconciling the state of the data object comprising modifying the data object based at least on part on the update; and
   transmitting, by the computer system, a notification identifying information associated with the update to a user of the external system.

2. The method of claim 1, wherein the one or more first configuration parameters that uniquely identify the first data asset comprise at least one of a hostname, a port identifier, an Internet Protocol (IP) address, a service name, a Universal Resource Locator (URL), a resource identifier, or a protocol type associated with the first data asset.

3. The method of claim 1, wherein the one or more first attributes of the data object associated with the first data asset further comprise at least one of a folder type, a namespace, a path, or an internal identifier of the data object.

4. The method of claim 1, further comprising:
   receiving, by the computer system, a query related to the data object associated with the first data asset by a user of the external system;
   retrieving, based at least in part on metadata associated with the data object, the first unique external identifier associated with the data object;
   retrieving information associated with the data object using the first unique external identifier; and
   transmitting the information associated with the data object to the user.

5. The method of claim 1, wherein the update to the data object associated with the first data asset comprises at least one of information related to a change in a name of the data object, information related to a time when the data object was last accessed, modified or refreshed, or information related to the number of times the data object was accessed.

6. The method of claim 1, further comprising:
   receiving, by the computer system, a query related to the data object associated with the first data asset by a user of the external system;
   determining, based at least in part on metadata associated with the data object, that no unique external identifier exists for the data object; and
   responsive to the determining, transmitting a request to create the first unique external identifier for the data object.

7. The method of claim 1, further comprising:
   retrieving information associated with the data object associated with the first data asset based at least in part on the first unique external identifier associated with the data object; and
   transmitting information associated with the data object associated with the first data asset to the user of the external system.

8. The method of claim 1, wherein the first unique external object identifier for the data object associated with the first data asset is different from the second unique external object identifier for the data object associated with the second data asset.

9. A system comprising:
   a memory storing a set of accounts and a set of attributes associated with the set of accounts; and
   one or more hardware processors configured to perform processing, the processing comprising:
   accessing a repository comprising metadata associated with a plurality of data assets, each data asset in the plurality of data assets comprising a plurality of data objects, the plurality of data assets associated with an external system that is communicatively coupled to the system;
   for a first data asset in the plurality of data assets, identifying, based at least in part on the metadata, one or more first configuration parameters that uniquely identify the first data asset;
   for a data object associated with the first data asset, identifying, based at least in part on the metadata, one or more first attributes of the data object that uniquely identify the data object, the one or more first attributes of the data object comprising a schema of the data object;
   generating a first unique external object identifier for the data object, the first unique external object identifier for the data object represented by a string of characters comprising a set of portions, a first portion of the set of portions comprising the one or more first configuration parameters that uniquely identify the first data asset, a second portion of the set of portions comprising the data object associated with the first data asset and a third portion of the set of portions comprising the schema of the data object that uniquely identifies a relationship between the first data asset and the data object associated with the first data asset;
   for a second data asset in the plurality of data assets, identifying, based at least in part on the metadata, one or more second configuration parameters that uniquely identify the second data asset, the second data asset being different from the first data asset;
   for a data object associated with the second data asset, identifying, based at least in part on the metadata, one or more second attributes of the data object that uniquely identify the data object associated with the second data asset, the one or more second attributes of the data object comprising an object type of the data object;
   generating a second unique external object identifier for the data object, the second unique external object identifier for the data object represented by a string of characters comprising a set of portions, a first portion of the set of portions comprising the one or more second configuration parameters that uniquely identify the second data asset, a second portion of the set of portions comprising the data object associated with the second data asset and a third portion of the set of portions comprising the object type of the data object that uniquely identifies a relationship between the second data asset and the data object associated with the second data asset;
   storing the first unique external object identifier for the data object associated with the first data asset in the repository;
   storing the second unique external object identifier for the data object associated with the second data asset in the repository,
   receiving an update to the data object associated with the first data asset;
   responsive to the update, using the first external object identifier for the data object for reconciling a state of the data object, reconciling the state of the data object comprising modifying the data object based at least on part on the update; and
   transmitting a notification identifying information associated with the update to a user of the external system.

10. The system of claim 9, wherein the processing further comprises:
    receiving a query related to the data object associated with the first data asset by a user of the external system;
    retrieving, based at least in part on metadata associated with the data object, the first unique external identifier associated with the data object;
    retrieving information associated with the data object using the first unique external identifier; and
    transmitting the information associated with the data object to the user.

11. The system of claim 9, wherein the update to the data object associated with the first data asset comprises at least one of information related to a change in a name of the data object, information related to a time when the data object was last accessed, modified or refreshed, or information related to the number of times the data object was accessed.

12. The system of claim 9, wherein the processing further comprises:
    receiving a query related to the data object associated with the first data asset by a user of the external system;
    determining, based at least in part on metadata associated with the data object, that no unique external identifier exists for the data object; and
    responsive to the determining, transmitting a request to create the first unique external identifier for the data object.

13. A non-transitory computer-readable medium having program code that is stored thereon, the program code executable by one or more processing devices for performing operations comprising:
    accessing a repository comprising metadata associated with a plurality of data assets, each data asset in the plurality of data assets comprising a plurality of data objects, the plurality of data assets associated with an external system that is communicatively coupled to the one or more processing devices;
    for a first data asset in the plurality of data assets, identifying, based at least in part on the metadata, one or more first configuration parameters that uniquely identify the first data asset;
    for a data object associated with the first data asset, identifying, based at least in part on the metadata, one or more first attributes of the data object that uniquely identify the data object, the one or more first attributes of the data object comprising a schema of the data object;
    generating a first unique external object identifier for the data object, the first unique external object identifier for the data object represented by a string of characters comprising a set of portions, a first portion of the set of portions comprising the one or more first configuration parameters that uniquely identify the first data asset, a second portion of the set of portions comprising the data object associated with the first data asset and a third portion of the set of portions comprising the schema of the data object that uniquely identifies a relationship between the first data asset and the data object associated with the first data asset;

for a second data asset in the plurality of data assets, identifying, based at least in part on the metadata, one or more second configuration parameters that uniquely identify the second data asset, the second data asset being different from the first data asset;

for a data object associated with the second data asset, identifying, based at least in part on the metadata, one or more second attributes of the data object that uniquely identify the data object associated with the second data asset, the one or more second attributes of the data object comprising an object type of the data object;

generating a second unique external object identifier for the data object, the second unique external object identifier for the data object represented by a string of characters comprising a set of portions, a first portion of the set of portions comprising the one or more second configuration parameters that uniquely identify the second data asset, a second portion of the set of portions comprising the data object associated with the second data asset and a third portion of the set of portions comprising the object type of the data object that uniquely identifies a relationship between the second data asset and the data object associated with the second data asset;

storing the first unique external object identifier for the data object associated with the first data asset in the repository;

storing the second unique external object identifier for the data object associated with the second data asset in the repository;

receiving an update to the data object associated with the first data asset;

responsive to the update, using the first external object identifier for the data object for reconciling a state of the data object, reconciling the state of the data object comprising modifying the data object based at least on part on the update; and transmitting a notification identifying information associated with the update to a user of the external system.

14. The non-transitory computer-readable medium of claim 13, wherein one or more first configuration parameters that uniquely identify the first data asset comprise at least one of a hostname, a port identifier, an Internet Protocol (IP) address, a service name, a Universal Resource Locator (URL), a resource identifier, or a protocol type associated with the data asset.

* * * * *

UNITED STATES PATENT AND TRADEMARK OFFICE
CERTIFICATE OF CORRECTION

PATENT NO. : 11,966,384 B2
APPLICATION NO. : 17/069778
DATED : April 23, 2024
INVENTOR(S) : Seetharaman et al.

It is certified that error appears in the above-identified patent and that said Letters Patent is hereby corrected as shown below:

In the Drawings

On sheet 5 of 9, in FIG. 5, under Reference Numeral 554, Line 2, delete "Intemet" and insert -- Internet --, therefor.

On sheet 5 of 9, in FIG. 5, under Reference Numeral 534, Line 1, delete "Intemet" and insert -- Internet --, therefor.

On sheet 5 of 9, in FIG. 5, under Reference Numeral 534, Line 1, delete "Intemet" and insert -- Internet --, therefor.

On sheet 6 of 9, in FIG. 6, under Reference Numeral 654, Line 1, delete "Intemet" and insert -- Internet --, therefor.

On sheet 7 of 9, in FIG. 7, under Reference Numeral 754, Line 1, delete "Intemet" and insert -- Internet --, therefor.

On sheet 7 of 9, in FIG. 7, under Reference Numeral 734, Line 1, delete "Intemet" and insert -- Internet --, therefor.

On sheet 7 of 9, in FIG. 7, under Reference Numeral 734, Line 1, delete "Intemet" and insert -- Internet --, therefor.

On sheet 8 of 9, in FIG. 8, under Reference Numeral 854, Line 1, delete "Intemet" and insert -- Internet --, therefor.

On sheet 8 of 9, in FIG. 8, under Reference Numeral 834, Line 1, delete "Intemet" and insert -- Internet --, therefor.

Signed and Sealed this
Sixth Day of August, 2024

Katherine Kelly Vidal
*Director of the United States Patent and Trademark Office*

CERTIFICATE OF CORRECTION (continued)
U.S. Pat. No. 11,966,384 B2

On sheet 8 of 9, in FIG. 8, under Reference Numeral 834, Line 1, delete "Intemet" and insert -- Internet --, therefor.

In the Specification

In Column 2, Line 40, delete "embodiments" and insert -- embodiments. --, therefor.

In Column 9, Line 24, delete "Schemal" and insert -- Schema1 --, therefor.

In the Claims

In Column 30, Line 3, in Claim 9, delete "repository," and insert -- repository; --, therefor.